United States Patent [19]
Rea

[11] Patent Number: 6,165,115
[45] Date of Patent: Dec. 26, 2000

[54] PROCESS FOR CLOSING AND HERMETICALLY SEALING A BOTTOM OF A CONTAINER

[75] Inventor: Keith Robert Rea, Florence, S.C.

[73] Assignee: Sonoco Development, Inc., Hartsville, S.C.

[21] Appl. No.: 09/275,554

[22] Filed: Mar. 24, 1999

Related U.S. Application Data

[62] Division of application No. 08/701,266, Aug. 22, 1996.

[51] Int. Cl.$^7$ ....................................................... B31B 1/90
[52] U.S. Cl. .......................... 493/109; 493/104; 493/108; 493/133; 493/140; 493/152; 493/158; 220/62.2; 220/616; 220/620
[58] Field of Search ................................... 220/620, 621, 220/616, 62.2, 62.22, 62.11; 493/109, 102, 133, 158, 189, 103, 104, 108, 140, 152

[56] References Cited

U.S. PATENT DOCUMENTS

| | | | |
|---|---|---|---|
| 1,568,790 | 1/1926 | Wright | 229/5.6 |
| 2,130,576 | 9/1938 | Annen et al. | 229/4.5 |
| 2,134,166 | 10/1938 | Wilcox | 229/5.6 |
| 2,434,505 | 1/1948 | Miller | 220/620 |
| 2,652,971 | 9/1953 | McFarland et al. | 229/4.5 |
| 2,887,244 | 5/1959 | Betner | 220/613 |
| 3,116,001 | 12/1963 | Carpenter et al. | 229/5.5 |
| 3,160,312 | 12/1964 | Johnston | 220/619 |
| 3,178,088 | 4/1965 | Herr | 229/4.5 |
| 3,182,882 | 5/1965 | Aellen, Jr. et al. | 229/4.5 |
| 3,358,876 | 12/1967 | Joosten et al. | 220/620 |
| 3,454,208 | 7/1969 | Amberg et al. | 229/619 |
| 3,468,224 | 9/1969 | Rausing et al. | 493/100 |
| 3,525,454 | 8/1970 | Frederiksen | 220/613 |
| 3,543,963 | 12/1970 | Helsler et al. | 220/619 |
| 3,709,398 | 1/1973 | Fuhrmann | 220/619 |
| 3,800,994 | 4/1974 | Bowen et al. | 220/620 |
| 3,961,566 | 6/1976 | Westphal | 493/104 |
| 4,117,971 | 10/1978 | Itoh | 220/620 |
| 4,303,190 | 12/1981 | Ditto et al. | 220/620 |
| 4,392,295 | 7/1983 | Sasai et al. | 220/620 |
| 4,556,166 | 12/1985 | Penttilä | 229/4.3 |
| 4,757,936 | 7/1988 | Homma et al. | 493/133 |
| 4,836,400 | 6/1989 | Chaffey et al. | 220/620 |
| 4,852,793 | 8/1989 | Homma et al. | 493/133 |
| 5,556,364 | 9/1996 | Konzal | 493/109 |
| 5,758,475 | 6/1998 | Breuer et al. | 493/109 |

Primary Examiner—Peter Vo
Assistant Examiner—Matthew Luby
Attorney, Agent, or Firm—Alston & Bird LLP

[57] ABSTRACT

A process is provided for closing and hermetically sealing a bottom of a container. A cylindrical container body is provided which has an inside heat-sealable surface and an open bottom end. A flange is formed on and around the bottom end of the cylindrical container body which extends outwardly from the container body at a sharp radius of approximately 90 degrees to an outside surface of the container body and which defines a flat circular heat-sealable surface on an outer side of the flange. A generally circular membrane patch having an inside heat-sealable surface is positioned on the flat circular heat-sealable surface of the container body flange covering the open bottom end of the container body. The heat-sealable surfaces of the container body flange and the membrane patch are heat-sealed to each other for hermetically sealing the container bottom end. If additional strength is desired in the bottom closure of the container, a circular reinforcing plug, preferably with an upwardly extending flange, is positioned on the membrane patch. The container body flange and the membrane patch heat-sealed thereto are then curled inwardly of the container body and over an outside periphery of the reinforcing plug while applying heat and pressure to complete closure of the container body and to maintain the cylindrical shape of the container.

5 Claims, 3 Drawing Sheets

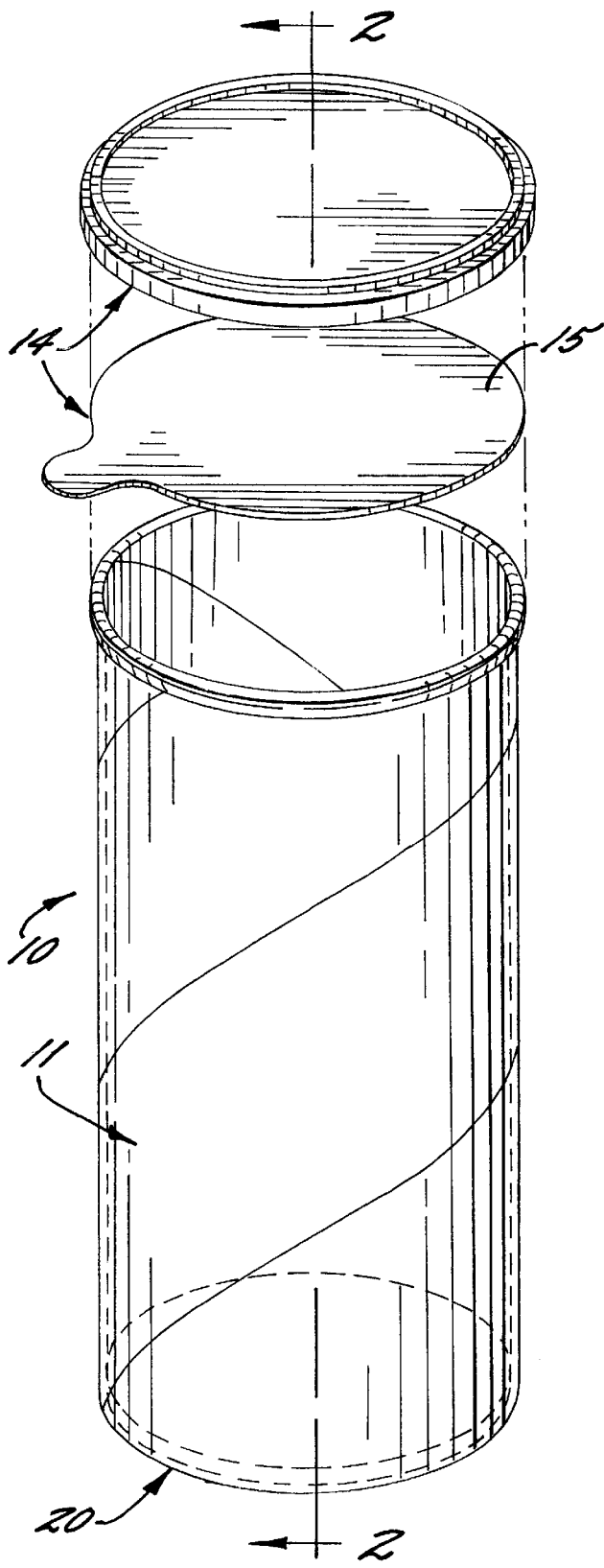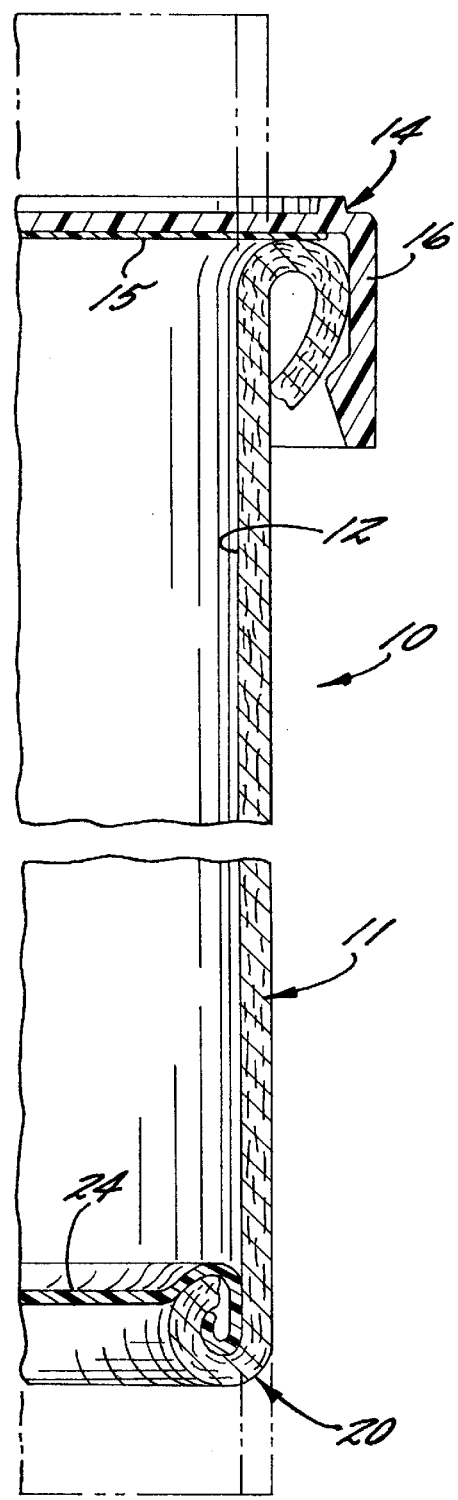
Fig. 1.
Fig. 2.

PROCESS FOR CLOSING AND HERMETICALLY SEALING A BOTTOM OF A CONTAINER

RELATED APPLICATIONS

This application is a divisional of application Ser. No. 08/701,266, filed Aug. 22, 1996.

FIELD OF THE INVENTION

This invention is directed to a process for closing and hermetically sealing a bottom of a container which preferably includes a composite container body and which is adaptable for use in containing food products and the like.

BACKGROUND OF THE INVENTION

Containers of this type are often used for packaging food products or the like including dry potato chips, powdered products, bread crumbs, ice cream and the like. These containers may be closed at the top thereof by a removable membrane which seals the inside of the container and may include an overcap which can be taken off and put back onto the container. It is desirable to close the bottom of these types of container with a simple hermetic sealing closure which is easy to install and which provides an effective hermetic seal. Although many different constructions of bottom closures have been provided on these types of containers, problems have been prevalent with these closures and with the hermetic seal. Also, strength problems have also been present in these bottom closures.

OBJECT AND SUMMARY OF THE INVENTION

Accordingly, it is an object of this invention to provide a process for closing and hermetically sealing a bottom of a container which improves over the processes heretofore utilized and provides an effective hermetic seal. It is a further object of this invention to provide such a process which also provides an element for strengthening the bottom closure.

It has been found by this invention that the above objects may be accomplished by providing a process for closing and hermetically sealing a bottom of a container which provides generally the following steps. A cylindrical container body is provided which has an inside heat-sealable surface and an open bottom end. A flange is formed on and around the bottom end of the cylindrical container body which extends outwardly from the container body at a sharp radius of approximately 90 degrees to an outside surface of the container body and which defines a flat circular heat-sealable surface on the outer side of the flange. A generally circular membrane patch having an inside heat-sealable surface is positioned on the flat circular heat-sealable surface of the container body flange for covering the open bottom end of the container body. The heat-sealable surfaces of the container flange and the membrane patch are heat-sealed to each other for hermetically sealing the container bottom end. The container body flange and the portion of the membrane patch heat-sealed thereto are curled inwardly of the cylindrical container body while heat and pressure is applied to complete closure of the bottom of the container and sealing thereof and to maintain the cylindrical shape of the container.

If additional strength is desired in the hermetically-sealed bottom closure of the container, the process may include an additional step of positioning a generally circular reinforcing plug on the membrane patch prior to the curling step and then curling the container body flange and the portion of the membrane patch heat-sealed thereto inwardly of the cylindrical container body and over an outside periphery of the reinforcing plug while applying heat and pressure to complete closure of the container and to retain the cylindrical shape of the container. Preferably, the circular reinforcing plug includes a flange around the outside periphery thereof which extends away from an outside surface of the reinforcing plug at an angle of approximately 90 degrees so that the container body flange and the membrane patch may be curled over the reinforcing plug flange.

Some of the objects and advantages of this invention having been stated above, other objects and advantages will become apparent in the detailed description of this invention to follow when taken in conjunction with the accompanying drawings, in which:

FIG. 1 is a perspective view of a container constructed in accordance with this invention and wherein the components of the top closure of the container are exploded;

FIG. 2 is a sectional view in non-exploded form and taken generally along the line 2—2 of FIG. 1;

DETAILED DESCRIPTION OF PREFERRED EMBODIMENTS OF THE INVENTION

Figure 3:
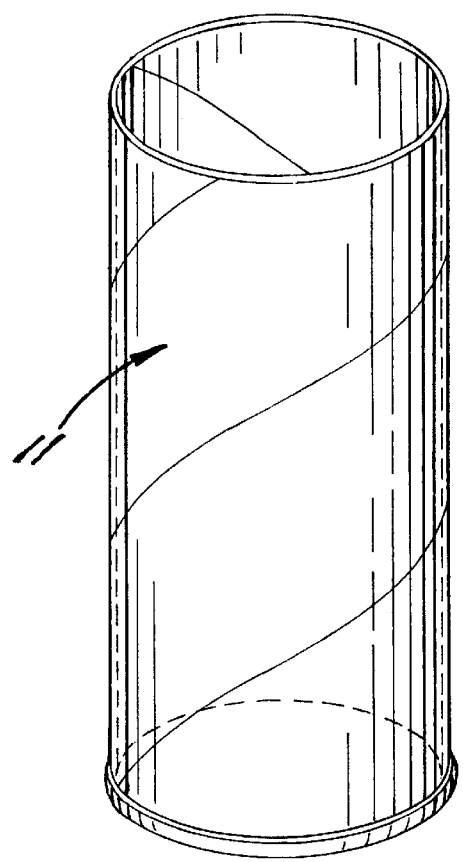
FIG. 3 is a perspective view of the container shown in FIG. 1, but without the top closure components and reversed with the bottom positioned at the top and prior to closing and hermetically sealing the bottom in accordance with the process of this invention.

Referring now to the drawings, FIGS. 1 and 2 illustrate a container, generally indicated at 10, which is constructed in accordance with the process of this invention. This container 10 comprises a generally cylindrical container body portion 11 which may be constructed of any suitable material and which preferably is of a composite material construction and may be spirally wound, convolutely wound or otherwise formed. The container body 11 is preferably of a composite construction including a desired combination of layers which may include a paper label layer, paper body plies and a suitable liner layer. The composite container 11 includes an inside-heat sealable surface 12 which may be formed of any suitable material including polyethylene polymers which may be formed as a coating or inside ply of the liner layer which may also include paper and foil plies. The container 10 further includes a top closure, generally indicated at 14. This top closure may be any desired type of conventionally used top closure including a membrane 15 constructed of any suitable material including a composite of desired plies of paper, foil and/or polyethylene polymers heat-sealed to the inside heat-sealable surface 12 of the container body 10 at the top end of the container 11 which has been curled outwardly (as shown in FIG. 2) to position the inside heat-sealable surface 12 at the top of the container 11. A suitable overcap 16 may also be provided and constructed of any suitable material, such as low density polyethylene and which is constructed so as to snap on and off of the top end of the container 11 both before the membrane seal 15 has been removed and after the membrane seal 15 has been removed to gain access to the interior of the container 11. The container 10 further includes a bottom closure, generally designated at 20, which is constructed in accordance with the process of this invention and which hermetically seals the bottom end of the container 10.

Figure 4:
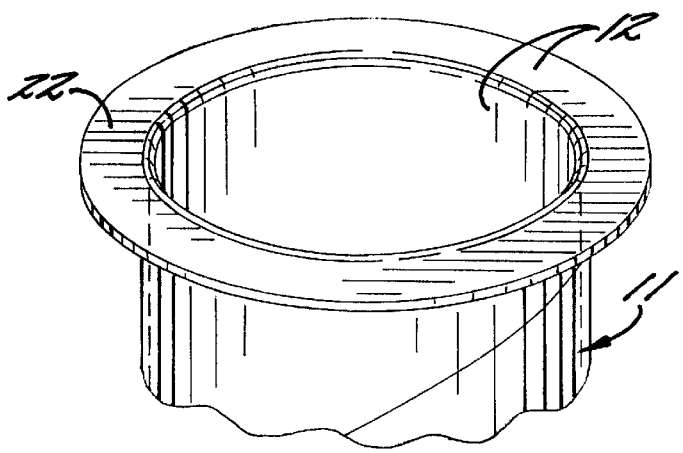
FIG. 4 is a partial perspective view of the bottom end of the container after the process step of forming a flange on and around the bottom end of the container body has been performed.
Figure 5:
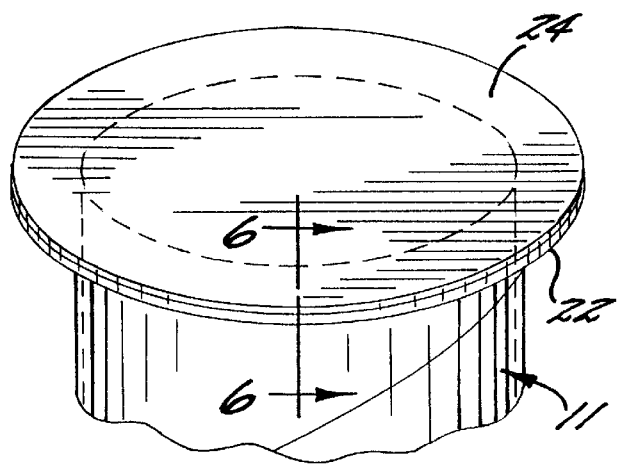
FIG. 5 is a partial perspective view of the bottom end of the container body, like FIG. 4, and after a generally circular membrane patch has been positioned on the flat surface of the container body flange.

In accordance with this invention, the bottom closure 20 of the container 10 is effected by the following process steps. A flange 22 is formed on and around the bottom end of the cylindrical container body 11 (the bottom end of the container body 11 is shown as the top end in FIGS. 3–9 since the process of closing hermetically sealing the container is preferably performed with the container body upside down). This flange 22 extends outwardly from the container body 11 at a sharp radius of approximately 90 degrees to an outside surface of the container body 11 and which defines a flat circular heat-sealable surface 12 on an outer side of the flange 22 (as shown particularly in FIGS. 4 and 6).

Figure 6:
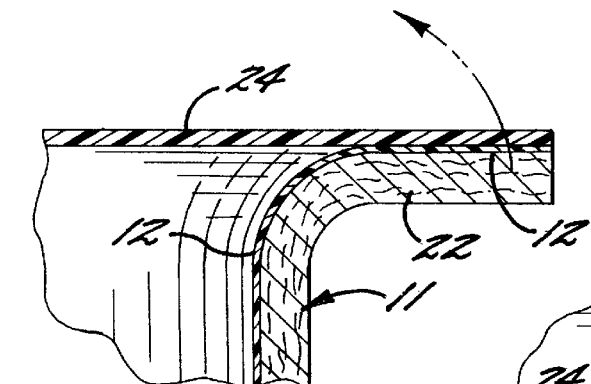
FIG. 6 is a sectional view, taken generally along the line 6—6 of FIG. 5, and illustrating the container body flange and portion of the membrane patch heat-sealed thereto just prior to being curled inwardly.
Figure 7:
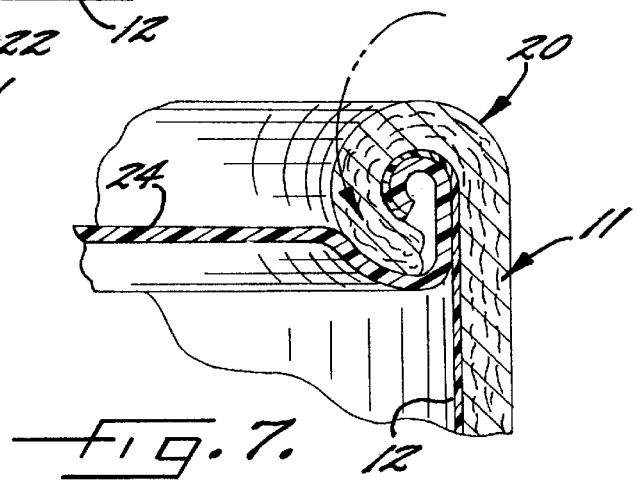
FIG. 7 is a sectional view, like FIG. 6, illustrating the curling of the container body flange and the membrane patch.

A generally circular membrane patch 24 having an inside heat-sealable surface is positioned on the flat circular heat-sealable surface 12 of the container body flange 22 for covering the open bottom end of the container body 11. The membrane patch 24 may be constructed of any suitable materials including a composite of desired plies of paper, foil and/or polyethylene polymers. The membrane patch 24 is then heat-sealed to the heat-sealable surface 12 of the container body flange 22 for hermetically sealing the container bottom end. Heat sealing of the membrane patch 24 to a container body flange 22 which is positioned in a generally flat condition, obtained by the 90 degree orientation, produces a superior hermetic seal. The container body flange 22 and the portion of the membrane patch heat-sealed thereto are then curled inwardly of the container body 11 (as shown in FIGS. 6 and 7) while applying heat and pressure to complete the bottom closure 20 and to maintain the cylindrical shape of the container 10.

Figure 8A:
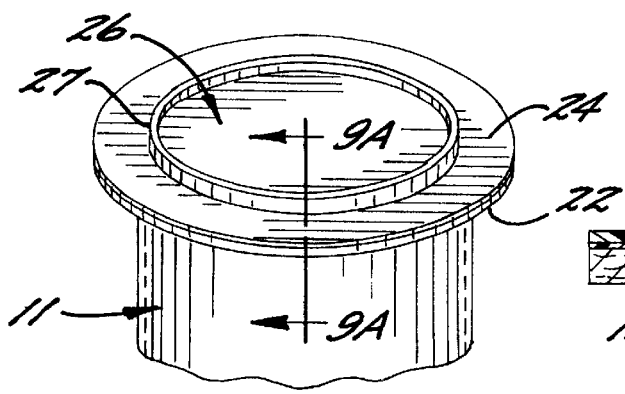
FIG. 8A is a partial perspective view, like FIG. 5, and illustrating a further preferred process step of positioning a generally circular reinforcing plug on the membrane patch prior to curling.
Figure 9A:
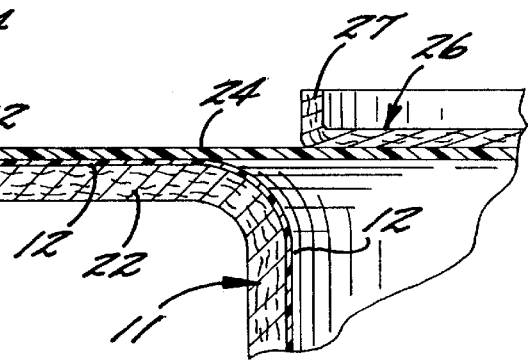
FIGS. 9A, 9B and 9C are sectional views taken along the lines 9A, 9B and 9C, respectively, of FIGS. 8A, 8B and 8C and further illustrating the process steps illustrated therein.
Figure 8B:
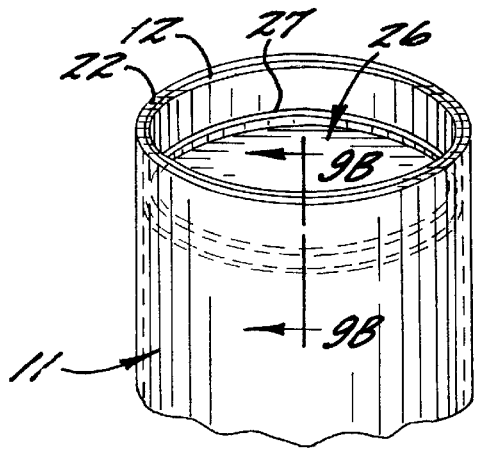
FIG. 8B is a partial perspective view, like FIG. 8A, and illustrating an intermediate phase of curling the container body flange and portion of the membrane patch heat-sealed thereto inwardly of the cylindrical container and over the outside periphery of the reinforcing plug.
Figure 9B:
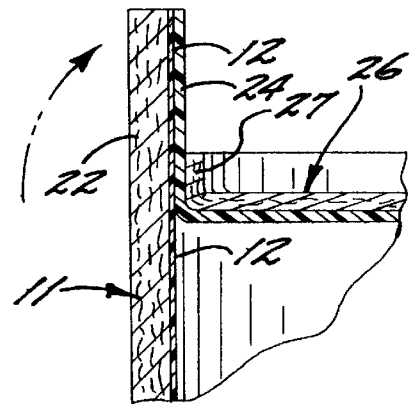
Figure 8C:
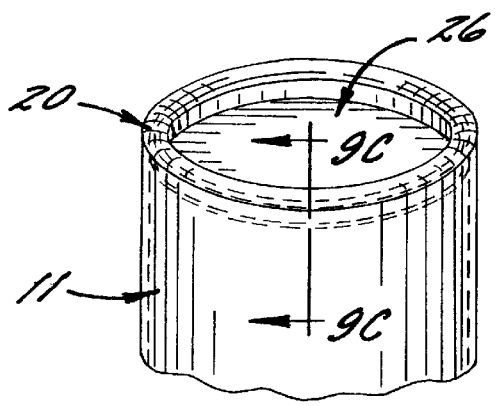
FIG. 8C is a partial perspective view, like FIG. 8B, illustrating the final stage of the curling process step.
Figure 9C:
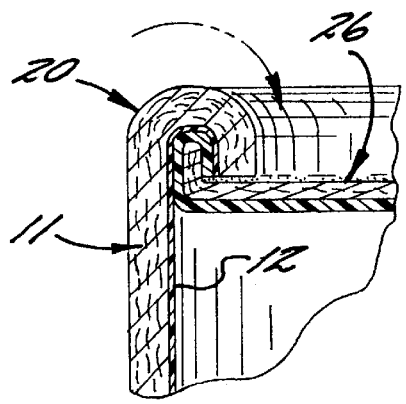

If it is desired to strengthen the bottom closure 20 of the container 10, the process for closing and hermetically sealing the bottom may further include positioning a generally circular reinforcing plug 26 (as shown in FIGS. 8A and 9A) on the membrane patch 24. This circular reinforcing plug 26 preferably includes a flange 27 around the outer periphery thereof and extending away from an outside surface of the reinforcing plug 26 at an angle of approximately 90 degrees (as shown in FIGS. 8A and 9A particularly). This reinforcing plug 26 may be formed of any suitable material including low density polyethylene. The container body flange 22 and the portion of the membrane patch 24 heat-sealed thereto is then curled inwardly of the container body 11 and over an outside periphery of the reinforcing plug 26 and its flange 27 (as shown in FIGS. 8B, 9B, 8C and 9C while applying heat and pressure to complete formation of the bottom closure 20 of the container 10 and to maintain the cylindrical shape of the container 10.

In the drawings and the specification, there has been set forth preferred embodiments of the invention and, although specific terms are employed, the terms are used in a generic and descriptive sense only and not for purpose of limitation, the scope of the invention being set forth in the following claims.

What is claimed is:

1. Process for closing and hermetically sealing a bottom end of a composite paper container comprising:

providing a cylindrical shaped container body constructed of a composite including paper body plies and having an inside heat-sealable polymer surface and an open bottom end;

forming a flange of a predetermined diameter on and around the bottom end of the cylindrical container body which extends outwardly from the container body at a sharp radius of approximately 90° to an outside surface of the container body and which defines a flat circular heat-sealable surface on an outer side of the flange;

positioning a flat generally circular membrane patch, constructed of a composite including paper plies and being of a predetermined diameter generally equal to the diameter of said flange and having an inside heat-sealable polymer surface, on the flat circular heat-sealable surface of the container body flange for covering the open bottom end of the container body;

heat-sealing the heat-sealable surfaces of the container body flange and the membrane patch to each other for hermetically sealing the container bottom end;

positioning a generally circular reinforcing plug having a predetermined diameter less than the predetermined diameter of said membrane patch on the membrane patch; and curling the container body flange and the portion of the membrane patch heat-sealed thereto inwardly of the cylindrical container body and over and around an outside periphery of the reinforcing plug while applying heat and pressure to complete closure of the container bottom and to maintain the cylindrical shape of the container.

2. Process, as set forth in claim 1, in which said container body is constructed of a composite including a paper label layer, paper body plies and a liner layer and in which said inside heat-sealable surface is constructed of polyethylene polymers.

3. Process, as set forth in claim 1, in which the membrane patch is constructed of a composite including plies of paper, foil and polyethylene polymers.

4. Process, as set forth in claim 1, in which said plug is constructed of low density polyethylene.

5. Process, as set forth in claim 1 in which the generally circular reinforcing plug includes a flange around the outside periphery thereof extending away from an outside surface of the reinforcing plug at an angle of approximately 90°.

* * * * *